United States Patent [19]

Zimmerly

[11] 4,237,010
[45] Dec. 2, 1980

[54] INTERCONNECTOR FOR FILTRATION MODULES

[75] Inventor: Robert D. Zimmerly, Kenosha, Wis.

[73] Assignee: Ladish Co., Cudahy, Wis.

[21] Appl. No.: 14,441

[22] Filed: Feb. 23, 1979

[51] Int. Cl.³ ............................................. B01D 35/00
[52] U.S. Cl. ..................................... 210/232; 210/541
[58] Field of Search ............... 210/232, 252, 541, 542; 285/53, 55, 260

[56] References Cited

U.S. PATENT DOCUMENTS

| 3,456,965 | 7/1969 | Gajewski et al. | 285/260 |
| 3,928,204 | 12/1975 | Thomas | 210/232 |

*Primary Examiner*—John Adee
*Attorney, Agent, or Firm*—Wheeler, Morsell, House & Fuller

[57] ABSTRACT

An interconnector for filtration modules comprises inner and outer integrally bonded coaxial rubber sleeves. The inner sleeve comprises rubber of a lower indentation hardness than the outer sleeve and is relatively soft while the outer sleeve is relatively hard and has an indentation hardness higher than that of the inner sleeve. The outer sleeve has an inwardly projecting rib or washer of said relatively hard rubber against which proximate ends of filtration module tubes abut. The inner sleeve has a circumferential slot or gap through which the washer projects inwardly.

3 Claims, 5 Drawing Figures

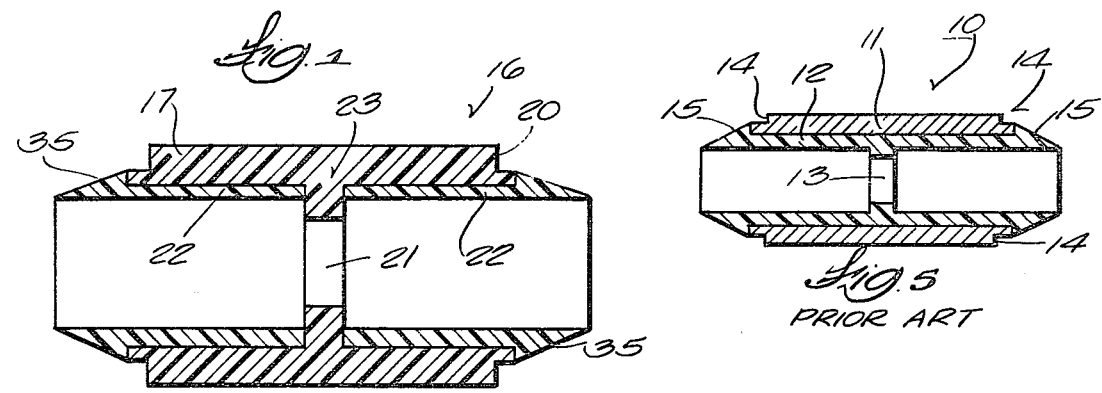
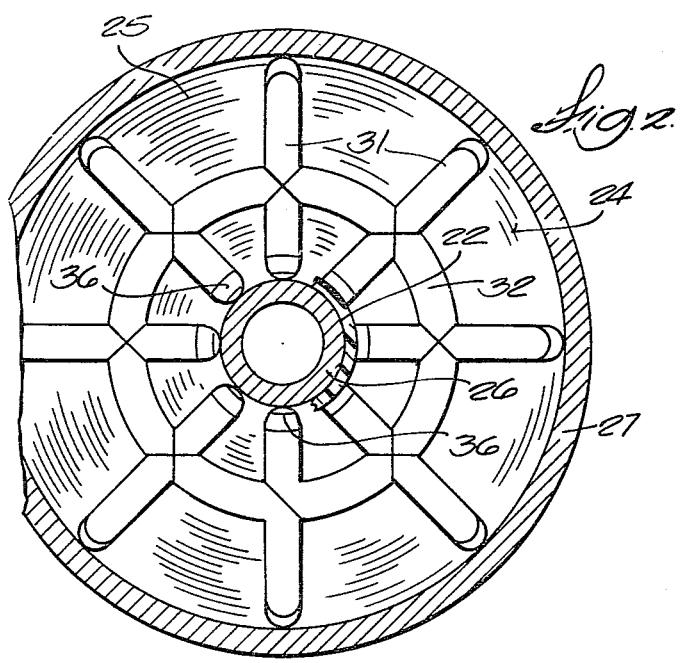
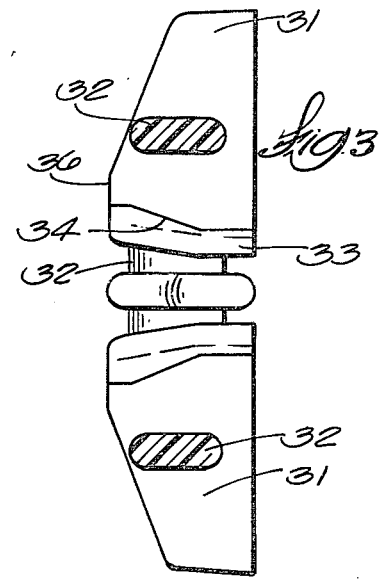
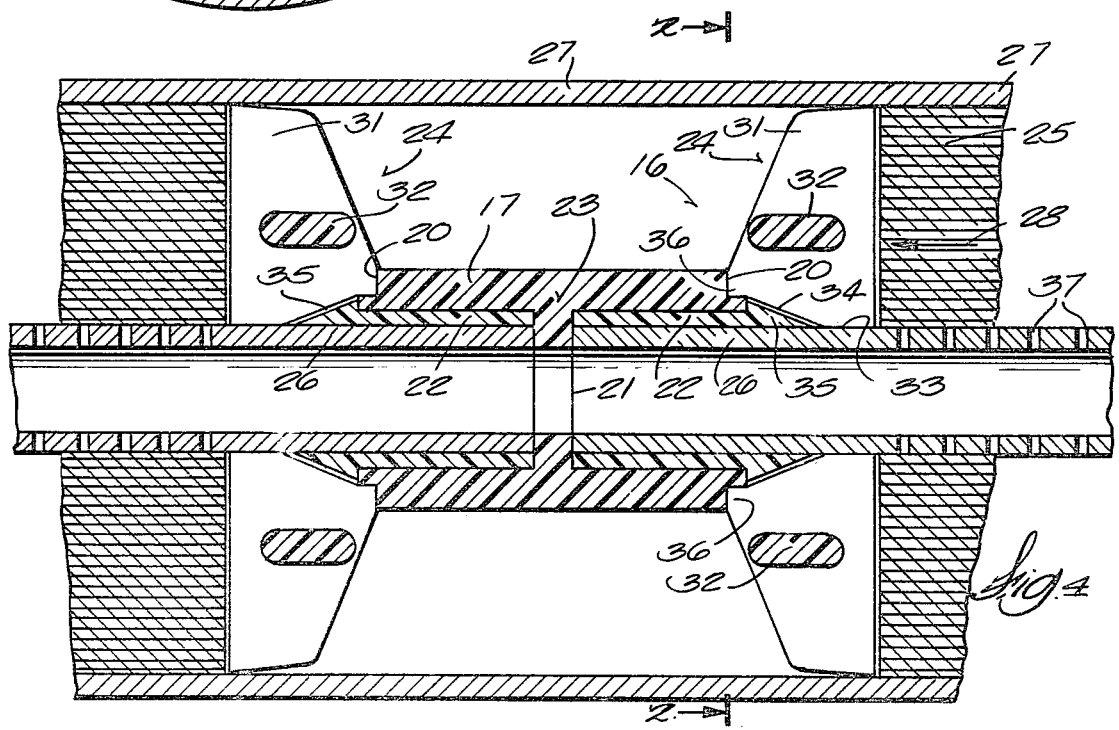

INTERCONNECTOR FOR FILTRATION MODULES

BACKGROUND OF THE INVENTION

A known prior art interconnector comprises a metal outer sleeve having a rubber inner sleeve or liner bonded thereto. The liner has an inwardly projecting rib or washer against which the proximate ends of tubes of filtration modules abut. This prior art interconnector is subject to certain limitations attributed primarily to the fact that the interconnector comprises metal and rubber sleeves which are bonded together. These limitations include:

1. In an attempt to achieve proper bonding between the metal sleeve and the rubber liner, the external metal sleeve has a relatively thin cross section. Accordingly, shoulders formed on such sleeve and against which anti-telescoping braces are seated and which are made out of plastic have insufficient seating surface areas. Accordingly, when the braces are subject to pressure, the plastic seats on the braces tend to shear off, thus resulting in failure of the structure and failure of the braces to preform their anti-telescoping function.

2. Utilization of an outer metal sleeve in the prior device typically results in poor bonding of the rubber to the metal. Even though the metal is thin, it is still too massive to bond properly to the rubber. This results in many bond failures. Cracks develop between the rubber liner and the metal sleeve. The rubber liner may even collapse during assembly of the liner with the sleeve.

3. The rubber liner washer is subject to failure because it is integral with the lip seals at the ends of the liner. If the lip seals are made of a rubber which has a low enough durometer and is sufficiently soft to properly seal with the module tubes, this rubber is too soft to constitute an effective bumper or washer to resist the impact shocks which are imposed on the washer when flow through the module is reversed for cleaning purposes. Prior art attempts to reinforce or back up the relatively soft rubber washer with a metal core have not been particularly successful because such devices have been subject to shear failures of the washer.

4. The small shoulder on the metal sleeve has insufficient bearing surface to contain shock loads exerted thereon by the anti-telescoping braces. The braces tend to ride up over the soft rubber seal at the end taper of the liner, thus deforming the rubber in ridges on its interior diameter and create channels for escape of fluid and destroy the seal. In accordance with the present invention, there is no contact between the anti-telescoping plate spokes and the soft rubber tapered extension. Accordingly, no pressure is exerted between the plate and the soft rubber, and such channels cannot be created.

Moreover, such prior art metal-rubber composite interconnectors are expensive to make and to use.

SUMMARY OF THE INVENTION

In accordance with the present invention, the interconnector is made all of rubber. The outer sleeve portion thereof is made of a rubber of relatively high indentation hardness (durometer) to withstand impact shocks and to integrally provide the washer which projects inwardly and against which the axially extending tubes of the filtration module abut. Accordingly, the washer of relatively high durometer rubber has sufficient impact resistance to withstand the impact shocks to which it is subject. The inner liner is also made of rubber but of a relatively lower indentation hardness (durometer) than the outer rubber sleeve and is hence softer. The two rubber sleeves bond easily together because of the similarity of the material. The relatively soft inner rubber liner has ideal sealing characteristics with the permeate tubes of the filtration modules. Moreover, because there is no longer any concern about a large metal mass which must be bonded to an interior rubber liner, the relatively hard outer rubber sleeve can be made considerably thicker than the thin metal sleeve of the prior art, thus to provide much larger shoulders against which the plastic anti-telescoping braces are seated. Accordingly, these large shoulders are much better able to withstand impact loads to which they are subject when the direction of flow through the modules is reversed. The plastic braces will not shear off as in the prior art device.

In accordance with the present invention, the interconnector comprises inner and outer bonded together coaxial rubber sleeves. The inner sleeve comprises rubber of a lower durometer than the outer sleeve and has tapered end portions adapted for sealing engagement with the permeate tubes of the filtration module. The outer sleeve comprises rubber of a higher durometer than the inner sleeve for impact resistance. The outer sleeve has an inwardly projecting rib or washer of said higher durometer rubber against which proximate ends of adjacent filtration module tubes abut. The inner sleeve has a circumferential slot or gap through which the washer projects inwardly.

Other objects, features and advantages of the invention will appear from the disclosure hereof.

DESCRIPTION OF THE DRAWINGS

FIG. 1 is a cross section taken through an interconnector embodying the present invention.

FIG. 2 is a cross section taken along the line 2—2 of FIG. 4.

FIG. 3 is a fragmentary cross section taken axially through an anti-telescoping brace.

FIG. 4 is an axial cross section taken through an assembly of interconnector embodying the present invention with filtration modules and anti-telescoping braces.

FIG. 5 is an axial cross section taken through an interconnector typifying the prior art.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The prior art interconnector 10 is shown in FIG. 5 and comprises a metal outer sleeve 11 having an inner rubber liner 12 which is bonded to the metal sleeve 11. At its midpoint, the rubber liner 12 has an inwardly projecting rib or washer 13 which provides an abutment for the proximate ends of the permeate collector tubes on the filtration modules. Near its opposite ends, the metal sleeve 11 has shoulders 14 which provide seats to receive the anti-telescoping braces 24 shown in FIGS. 2-4. The seats 14 of the prior art device of FIG. 5 are rather shallow and are subject to the deficiency hereinbefore mentioned. Near its ends, the inner rubber liner 12 is tapered at 15 to provide a seal against the permeate tubes.

The prior art interconnector 10 of FIG. 5 is subject to all of the limitations hereinbefore mentioned.

The interconnector 16 of the present invention is shown in FIG. 1. There is no metal in this interconnector. It is made entirely of rubber, either natural or synthetic. Buna-N is the preferred rubber. Interconnector 16 comprises an outer relatively hard rubber sleeve 17 and a coaxial inner softer rubber sleeve 22. Outer harder rubber sleeve 17 has a relatively high indentation hardness, preferably in the durometer range of approximately 49 to 55 measured on the type D Durometer scale per ASTM Standard D2240.

Accordingly, sleeve 17 has high impact resistance, and is ideally suited to function as a shield for the softer rubber liner therewithin. It is structurally strong enough to withstand the external forces which develop when the system is pressurized and prevents the softer inner liner 22 from being collapsed onto the permeate tubes 26. Harder rubber sleeve 17 serves ideally as a support base for the anti-telescoping braces 24 shown separately in FIGS. 2-4. At its opposite ends, the sleeve 17 is provided with broad shoulders 20 which are much deeper radially than the shoulders 14 of the prior art device shown in FIG. 5, thus to provide a firmer and more shock-resistant support for the anti-telescoping braces 24. In the embodiment illustrated in FIG. 1, the radial extent of shoulders 20 is approximately four times as great as the radial extent of shoulders 14 of the prior art interconnector of FIG. 5.

At its longitudinal midpoint, the outer sleeve 17 is provided with an inwardly extending integral rib or washer 21 which performs the same function as washer 13 of the prior interconnector of FIG. 5, except that washer 21 is fabricated of the same higher durometer harder rubber as the outer sleeve 17 and is hence stronger and has higher impact resistance, better adapting it to withstand shocks imposed thereon by the permeate tubes 26 of the filtration modules in the assembly shown in FIG. 4. At the same time, washer 21 is soft enough to seal the ends of permeate tubes 26. Washer 21 is compressed somewhat by the axial pressure of tubes 26 during the assembly operation.

Coaxial with sleeve 17 is an inner softer rubber sleeve 22 of relatively low indentation hardness, preferably in the durometer range of approximately 60 to 70 as measured on the type A Durometer scale per ASTM Standard D2240.

To accommodate for the washer 21, sleeve 22 is desirably made in two parts, one at each side of the washer 21 and axially abutting thereagainst. The space between the proximate ends of the respective halves of sleeves 22 constitutes a slot or gap 23 through which the harder rubber washer 21 extends radially inwardly.

The two rubber sleeves 17, 22 are bonded together to integrate them into a composite rubber cylinder having a harder rubber outer surface, a softer rubber inner surface and a harder rubber rib or washer 21.

FIG. 4 shows the assembly of the interconnector 16 with the anti-telescoping braces 24 and the filtration modules 25. The modules 25 have axially projecting permeate collection tubes 26. The assembly is contained within a pressure vessel 27 through which liquid flows, for example, in the direction of arrow 28, although counterflow is typically induced for cleaning purposes.

Interconnector 16 is securely braced in position by the relatively hard rubber washer 21. The anti-telescoping braces 24 are supported in place by the shoulders 20 on the relatively hard outer sleeve 17 and brace the filtration modules 25 from shifting axially in the assembly. The braces 24 each comprise a series of radially oriented fins or plates 31 which are held in assembled relationship by an annulus 32. The radially innermost axially extending edges 33 of plates 31 are in sliding engagement with the outer periphery of the permeate collecting tubes 26. These edges 33 are inclined to the axis of tubes 26 at 34, the inclined edges 24 being spaced slightly from tapered end portions 35 of the inner rubber sleeve 22. Accordingly, no pressure is exerted by the braces 24 on the relatively soft rubber of the tapered ends 35 of inner sleeve 22. The plates 31 are further provided with bearing pad portions 36 which seat against the shoulder 20 of the relatively hard outer sleeve 17 of the interconnector 16. The braces 24 are preferably constructed of material approved for use in food processing equipment, such as synthetic plastic material or stainless steel.

The permeate collection tubes 26 of the filtration modules are provided with openings 37 through which fluid passing through the filtration modules 25 may enter the tubes 26 and be conveyed therein through the interconnector 16 to the next filtration module 25. Permeate tube 26 is sealed against the interconnector 16 by the pressure exerted against the relatively soft tapered rubber lip 35 by the fluid within the vessel 27.

Reversing fluid product flow will occasion hydraulic shock to the interconnector and this shock is absorbed by relatively hard rubber washer 21. Reversing the flow is utilized for cleaning purposes.

The interconnector of the present invention solves the problems referred to earlier in this specification and is not subject to the limitations of the prior art interconnector which required bonding a metal sleeve to a rubber liner. By utilizing in the present invention an outer sleeve of a relatively hard rubber and an inner sleeve of a relatively soft rubber, good bonding between the two sleeves is achieved. The characteristics of the relatively hard rubber are utilized where high resistance to impact is required and the characteristics of the relatively soft rubber are utilized where good sealing engagement is desired. By eliminating metal, the relatively hard rubber outer sleeve 17 can be made substantially thicker than the prior art interconnector and has an ample bearing surface at its shoulder 20 to provide a firm seat for the anti-telescoping braces 24, thus avoiding shearing off of the plastic fins or spokes 31 of the braces when flow is reversed and heavy shock load is imposed between the brace pads 36 and the interconnection shoulder 20. The washer 21 is strong enough to withstand shock loads imposed thereon by the permeate tubes 26 when flow is reversed, but soft enough to seal the ends of the tubes. The relatively soft rubber of the inner sleeve 22, particularly at its tapered end portions 35, acts as an effective seal against tubes 26. Interconnectors embodying the present invention have been utilized extensively without encountering failure problems which were typical of the prior art interconnectors and which were previously referred to in this specification.

I claim:

1. An interconnector for filtration modules having axially extending tubes, said interconnector comprising inner and outer bonded together coaxial rubber sleeves, the inner sleeve comprising two sleeve portions of rubber of a lower indentation hardness than the outer sleeve and having end portions adapted for sealing engagement with said tubes, the outer sleeve comprising rubber of a higher indentation hardness than the inner sleeve portions for impact resistance, said outer sleeve having an inwardly projecting annular inwardly extending rib forming a washer of said higher indentation hardness rubber against which proximate ends of adjacent tubes abut and are separated by said washer, said washer having sufficient softness to be compressed slightly by axial pressure exerted thereon by said tubes to provide end seals for the axially extending tubes and wherein the outer sleeve has an indentation hardness of approximately 49 to 55 on the type D Durometer scale and the inner sleeve portions and said annular rib have an indentation hardness of approximately 60 to 70 on the type A Durometer scale.

2. The invention of claim 1 in which anti-telescoping braces are interposed between the filtration modules and the interconnector, the outer sleeve of higher indentation hardness rubber having a shoulder at each end against which said anti-telescoping braces seat.

3. The invention of claim 2 in which the inner relatively soft sleeve has tapered ends which seal against said tubes, said anti-telescoping braces having fins spaced from said tapered ends.

* * * * *